US008737952B2

(12) United States Patent
Ahtisaari et al.

(10) Patent No.: US 8,737,952 B2
(45) Date of Patent: *May 27, 2014

(54) ADVERTISEMENT SCHEDULING (71) Applicant: Apple Inc., Cupertino, CA (US)

(72) Inventors: Marko Ahtisaari, Helsinki (FI); Timo Romppanen, Helsinki (FI); Jon Fisher, London (GB); Ismo Antikainen, Masala (FI); Janne Aaltonen, Turku (FI)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/828,418

(22) Filed: Mar. 14, 2013

(65) Prior Publication Data
US 2013/0267197 A1 Oct. 10, 2013

Related U.S. Application Data (63) Continuation of application No. 11/996,870, filed as application No. PCT/EP2008/050208 on Jan. 9, 2008, now Pat. No. 8,417,226.

(30) Foreign Application Priority Data

Jan. 9, 2007 (GB) .................................. 0700340.3
Aug. 16, 2007 (GB) .................................. 0716001.3

(51) Int. Cl.
H04J 3/00 (2006.01)
H04M 11/00 (2006.01)
H04M 3/42 (2006.01)

(52) U.S. Cl.
USPC ......... 455/405; 370/336; 455/406; 455/414.1

(58) Field of Classification Search
USPC .............. 455/414, 1, 406, 413; 370/336, 334; 706/21; 705/40
See application file for complete search history.

(56) References Cited

U.S. PATENT DOCUMENTS 4,811,382 A   3/1989 Sleevi
4,935,956 A   6/1990 Hellwarth
(Continued)

FOREIGN PATENT DOCUMENTS

BE   1015704    7/2005
DE   19941461   3/2001
(Continued)

OTHER PUBLICATIONS

"Advertisement System, Method and Computer Program Product", IP.com Prior Art Database Disclosure, Pub No. IPCOM000138557D, dated Jul. 24, 2006, IP.com, Amherst, NY (Available online at http://priorartdatabase.com/IPCOM/000138557, last visited Aug. 30, 2010).

(Continued)

Primary Examiner — Nizar Sivji
(74) Attorney, Agent, or Firm — Novak Druce Connolly Bove + Quigg LLP (57) ABSTRACT Embodiments of the invention are concerned with a method and a system for scheduling the transmission of messages to a subscriber in a communications network based on communications events determined to have occurred from communications events generated by the communications network. The method includes identifying a communications event as one of a plurality of predetermined types of communications events on the basis of at least one said identified current or previous communications session, and, responsive to the identified communications event triggering a scheduling process for scheduling transmission of a message to the subscriber, in which the scheduling process is dependent on the type of communications event. Thus in embodiments of the invention, the transmission of messages is determined on the basis of communications events associated with the subscriber; typical communications events include making calls, sending messages, switching off, switching on, roaming, cell to cell handover, answering calls, and trends.

21 Claims, 4 Drawing Sheets

(56) References Cited

U.S. PATENT DOCUMENTS

| | | |
|---|---|---|
| 5,408,519 A | 4/1995 | Pierce et al. |
| 5,459,306 A | 10/1995 | Stein et al. |
| 5,592,535 A | 1/1997 | Klotz |
| 5,600,364 A | 2/1997 | Hendricks et al. |
| 5,678,179 A | 10/1997 | Turcotte et al. |
| 5,752,238 A | 5/1998 | Dedrick |
| 5,978,775 A | 11/1999 | Chen |
| 5,978,833 A | 11/1999 | Pashley et al. |
| 6,006,197 A | 12/1999 | d'Eon et al. |
| 6,009,410 A | 12/1999 | LeMole et al. |
| 6,023,700 A | 2/2000 | Owens et al. |
| 6,044,259 A | 3/2000 | Hentila et al. |
| 6,097,942 A | 8/2000 | Laiho |
| 6,253,189 B1 | 6/2001 | Feezell et al. |
| 6,286,005 B1 | 9/2001 | Cannon |
| 6,408,309 B1 | 6/2002 | Agarwal |
| 6,411,946 B1 | 6/2002 | Chaudhuri ............... 706/21 |
| 6,502,076 B1 | 12/2002 | Smith |
| 6,639,977 B1 | 10/2003 | Swope et al. |
| 6,647,269 B2 | 11/2003 | Hendrey et al. |
| 6,718,178 B1 | 4/2004 | Sladek et al. |
| 6,738,978 B1 | 5/2004 | Hendricks et al. |
| 6,889,054 B2 | 5/2005 | Himmel et al. |
| 7,016,864 B1 | 3/2006 | Notz et al. |
| 7,039,599 B2 | 5/2006 | Merriman et al. |
| 7,072,947 B1 | 7/2006 | Knox et al. |
| 7,164,927 B1 | 1/2007 | Koch et al. |
| 7,168,084 B1 | 1/2007 | Hendricks et al. |
| 7,280,818 B2 | 10/2007 | Clayton ............... 455/407 |
| 7,343,312 B2 * | 3/2008 | Capek et al. ............ 705/7.19 |
| 7,349,527 B2 | 3/2008 | Yacoub et al. |
| 7,356,477 B1 | 4/2008 | Allan et al. |
| 7,529,357 B1 | 5/2009 | Rae et al. |
| 7,539,652 B2 | 5/2009 | Flinn et al. |
| 7,669,212 B2 | 2/2010 | Alao et al. |
| 7,729,988 B1 | 6/2010 | Walker et al. |
| 7,730,017 B2 | 6/2010 | Nance et al. |
| 7,734,632 B2 | 6/2010 | Wang |
| 7,747,676 B1 | 6/2010 | Nayfeh et al. |
| 7,912,843 B2 | 3/2011 | Murdock et al. |
| 8,046,797 B2 | 10/2011 | Bentolila et al. |
| 8,060,406 B2 | 11/2011 | Blegen |
| 8,191,098 B2 | 5/2012 | Cooper et al. |
| 8,229,786 B2 | 7/2012 | Cetin et al. |
| 2001/0008404 A1 | 7/2001 | Naito et al. |
| 2002/0006803 A1 | 1/2002 | Mendiola et al. |
| 2002/0010645 A1 | 1/2002 | Hagen et al. |
| 2002/0019829 A1 | 2/2002 | Shapiro |
| 2002/0021809 A1 | 2/2002 | Salo et al. |
| 2002/0075305 A1 | 6/2002 | Beaton et al. |
| 2002/0077130 A1 | 6/2002 | Owensby |
| 2002/0120498 A1 | 8/2002 | Gordon et al. |
| 2002/0128908 A1 | 9/2002 | Levin et al. |
| 2002/0137507 A1 | 9/2002 | Winkler |
| 2002/0138291 A1 | 9/2002 | Vaidyanathan et al. |
| 2002/0161770 A1 | 10/2002 | Shapiro et al. |
| 2002/0164977 A1 | 11/2002 | Link, II et al. |
| 2002/0183040 A1 | 12/2002 | Lundstrom et al. |
| 2002/0193093 A1 | 12/2002 | Henrickson et al. |
| 2003/0003929 A1 | 1/2003 | Himmel et al. |
| 2003/0023489 A1 | 1/2003 | McGuire et al. |
| 2003/0040297 A1 | 2/2003 | Pecen et al. |
| 2003/0040300 A1 | 2/2003 | Bodic et al. |
| 2003/0076940 A1 | 4/2003 | Manto |
| 2003/0083931 A1 | 5/2003 | Lang |
| 2003/0096599 A1 | 5/2003 | Takatsuki ............... 455/412 |
| 2003/0110171 A1 | 6/2003 | Ozer et al. |
| 2003/0126015 A1 | 7/2003 | Chan et al. |
| 2003/0126146 A1 | 7/2003 | Van Der Riet |
| 2003/0130887 A1 | 7/2003 | Nathaniel |
| 2003/0197719 A1 | 10/2003 | Lincke et al. |
| 2003/0216147 A1 | 11/2003 | Morin et al. |
| 2004/0068435 A1 | 4/2004 | Braunzell |
| 2004/0133480 A1 | 7/2004 | Domes |
| 2004/0137874 A1 | 7/2004 | Veerepalli et al. |
| 2004/0158612 A1 | 8/2004 | Concannon |
| 2004/0180648 A1 | 9/2004 | Hymel |
| 2004/0185827 A1 | 9/2004 | Parks |
| 2004/0192359 A1 | 9/2004 | McRaild et al. |
| 2004/0209649 A1 | 10/2004 | Lord |
| 2004/0240649 A1 | 12/2004 | Goel |
| 2004/0259526 A1 | 12/2004 | Goris et al. |
| 2005/0027676 A1 | 2/2005 | Eichstadt et al. |
| 2005/0055408 A1 | 3/2005 | Dong |
| 2005/0075929 A1 | 4/2005 | Wolinsky et al. |
| 2005/0086141 A1 | 4/2005 | Lewis |
| 2005/0113064 A1 | 5/2005 | Halsell |
| 2005/0123111 A1 | 6/2005 | Philbin et al. |
| 2005/0125397 A1 | 6/2005 | Gross et al. |
| 2005/0148350 A1 | 7/2005 | Kamphuis |
| 2005/0186940 A1 | 8/2005 | Schatzberger et al. |
| 2005/0228680 A1 | 10/2005 | Malik |
| 2005/0229209 A1 | 10/2005 | Hildebolt et al. |
| 2005/0238154 A1 | 10/2005 | Heaton et al. |
| 2005/0239504 A1 | 10/2005 | Ishii et al. |
| 2005/0267798 A1 | 12/2005 | Panara |
| 2005/0273465 A1 | 12/2005 | Kimura |
| 2006/0025109 A1 | 2/2006 | Levitan |
| 2006/0025129 A1 | 2/2006 | Wolfman |
| 2006/0025163 A1 | 2/2006 | Smith et al. |
| 2006/0031327 A1 | 2/2006 | Kredo |
| 2006/0041470 A1 | 2/2006 | Filho et al. |
| 2006/0048059 A1 | 3/2006 | Etkin |
| 2006/0068845 A1 | 3/2006 | Muller et al. |
| 2006/0094406 A1 | 5/2006 | Cortegiano |
| 2006/0109969 A1 | 5/2006 | Oh |
| 2006/0117378 A1 | 6/2006 | Tam et al. |
| 2006/0123014 A1 | 6/2006 | Ng |
| 2006/0148555 A1 | 7/2006 | Dent et al. |
| 2006/0167747 A1 | 7/2006 | Goodman et al. |
| 2006/0200460 A1 | 9/2006 | Meyerzon et al. |
| 2006/0200461 A1 | 9/2006 | Lucas et al. |
| 2006/0252512 A1 | 11/2006 | Walker et al. ............... 463/25 |
| 2006/0253327 A1 | 11/2006 | Morris et al. |
| 2006/0276170 A1 | 12/2006 | Radhakrishnan et al. |
| 2006/0276213 A1 | 12/2006 | Gottschalk et al. |
| 2006/0282319 A1 | 12/2006 | Maggio |
| 2006/0282328 A1 | 12/2006 | Gerace et al. |
| 2006/0286962 A1 | 12/2006 | Davis |
| 2006/0286963 A1 | 12/2006 | Koskinen et al. |
| 2006/0288124 A1 | 12/2006 | Kraft et al. |
| 2007/0004380 A1 | 1/2007 | Ylikoski |
| 2007/0016488 A1 | 1/2007 | Ulenas |
| 2007/0016743 A1 | 1/2007 | Jevans |
| 2007/0022021 A1 | 1/2007 | Walker et al. |
| 2007/0027703 A1 | 2/2007 | Hu et al. |
| 2007/0027760 A1 | 2/2007 | Collins et al. |
| 2007/0027762 A1 | 2/2007 | Collins et al. |
| 2007/0033104 A1 | 2/2007 | Collins et al. |
| 2007/0061195 A1 | 3/2007 | Liu et al. |
| 2007/0074262 A1 | 3/2007 | Kikkoji et al. |
| 2007/0077911 A1 | 4/2007 | Raman |
| 2007/0091869 A1 | 4/2007 | Kahn |
| 2007/0094066 A1 | 4/2007 | Kumar et al. |
| 2007/0100805 A1 | 5/2007 | Ramer et al. |
| 2007/0105536 A1 | 5/2007 | Tingo, Jr. |
| 2007/0136457 A1 | 6/2007 | Dai et al. |
| 2007/0156534 A1 | 7/2007 | Lerner et al. |
| 2007/0192409 A1 | 8/2007 | Kleinstern et al. |
| 2007/0232300 A1 | 10/2007 | Wolfman |
| 2007/0233671 A1 | 10/2007 | Oztekin et al. |
| 2007/0237330 A1 | 10/2007 | Srivastava |
| 2007/0244750 A1 | 10/2007 | Grannan et al. |
| 2007/0260624 A1 | 11/2007 | Chung et al. |
| 2008/0052158 A1 | 2/2008 | Ferro et al. |
| 2008/0057917 A1 | 3/2008 | Oria |
| 2008/0065491 A1 | 3/2008 | Bakman |
| 2008/0071929 A1 | 3/2008 | Motte et al. |
| 2008/0075249 A1 | 3/2008 | Zach |
| 2008/0091796 A1 | 4/2008 | Story |
| 2008/0125080 A1 | 5/2008 | Phillips |
| 2008/0133344 A1 | 6/2008 | Hyder et al. |
| 2008/0134043 A1 | 6/2008 | Georgis et al. |
| 2008/0140508 A1 | 6/2008 | Anand et al. |

(56) References Cited

U.S. PATENT DOCUMENTS

| | | | |
|---|---|---|---|
| 2008/0228568 A1 | 9/2008 | Williams et al. | |
| 2008/0249832 A1 | 10/2008 | Richardson et al. | |
| 2008/0271068 A1 | 10/2008 | Ou et al. | |
| 2008/0319836 A1 | 12/2008 | Aaltonen et al. | |
| 2009/0006194 A1 | 1/2009 | Sridharan et al. | |
| 2009/0029721 A1 | 1/2009 | Doraswamy | |
| 2009/0049090 A1 | 2/2009 | Shenfield et al. | |
| 2009/0063249 A1 | 3/2009 | Tomlin et al. | |
| 2009/0075627 A1 | 3/2009 | Hwang | |
| 2009/0083062 A1* | 3/2009 | Gupta | 705/1 |
| 2009/0106111 A1 | 4/2009 | Walk et al. | |
| 2009/0125377 A1 | 5/2009 | Somji et al. | |
| 2009/0132395 A1 | 5/2009 | Lam et al. | |
| 2009/0138304 A1 | 5/2009 | Aharoni et al. | |
| 2009/0197619 A1 | 8/2009 | Colligan et al. | |
| 2009/0216847 A1 | 8/2009 | Krishnaswamy et al. | |
| 2009/0240677 A1 | 9/2009 | Parekh et al. | |
| 2009/0286520 A1 | 11/2009 | Nielsen et al. | |
| 2009/0287619 A1 | 11/2009 | Liang et al. | |
| 2009/0298483 A1 | 12/2009 | Bratu et al. | |
| 2010/0030647 A1 | 2/2010 | Shahshahani | |
| 2010/0082397 A1 | 4/2010 | Blegen | |
| 2010/0082423 A1 | 4/2010 | Nag et al. | |
| 2010/0088152 A1 | 4/2010 | Bennett | |
| 2010/0114654 A1 | 5/2010 | Lukose et al. | |
| 2010/0125505 A1 | 5/2010 | Puttaswamy | |
| 2010/0138271 A1 | 6/2010 | Henkin | |
| 2010/0153216 A1 | 6/2010 | Liang et al. | |
| 2010/0161424 A1 | 6/2010 | Sylvain | |
| 2010/0169157 A1 | 7/2010 | Muhonen et al. | |
| 2010/0169176 A1 | 7/2010 | Turakhia | |
| 2010/0205541 A1 | 8/2010 | Rapaport et al. | |
| 2010/0228603 A1 | 9/2010 | Bolder et al. | |
| 2011/0087526 A1 | 4/2011 | Morgenstern et al. | |
| 2011/0106840 A1 | 5/2011 | Barrett et al. | |
| 2011/0209067 A1 | 8/2011 | Bogess et al. | |
| 2011/0225048 A1 | 9/2011 | Nair | |
| 2011/0238485 A1 | 9/2011 | Haumont et al. | |
| 2011/0276401 A1 | 11/2011 | Knowles et al. | |

FOREIGN PATENT DOCUMENTS

| | | |
|---|---|---|
| EP | 1073293 | 1/2001 |
| EP | 1109371 | 6/2001 |
| EP | 1161093 | 12/2001 |
| EP | 1193955 | 4/2002 |
| EP | 1220132 | 7/2002 |
| EP | 1239395 | 9/2002 |
| EP | 1253542 | 10/2002 |
| EP | 1280087 | 1/2003 |
| EP | 1298945 | 4/2003 |
| EP | 1320214 | 6/2003 |
| EP | 1324250 | 7/2003 |
| EP | 1365604 | 11/2003 |
| EP | 1 445 703 A | 8/2004 |
| EP | 1455511 | 9/2004 |
| EP | 1528827 | 5/2005 |
| EP | 1587332 | 10/2005 |
| EP | 1613102 | 1/2006 |
| EP | 1615455 | 1/2006 |
| EP | 1633100 | 3/2006 |
| EP | 1772822 | 4/2007 |
| GB | 2352856 | 2/2001 |
| GB | 2356777 | 5/2001 |
| GB | 2372867 | 9/2002 |
| GB | 2383149 | 6/2003 |
| GB | 2406996 | 4/2005 |
| GB | 2407002 | 4/2005 |
| JP | 2002140272 | 5/2002 |
| WO | 96/24213 | 8/1996 |
| WO | 97/33421 | 9/1997 |
| WO | 98/37685 | 8/1998 |
| WO | 98/53637 | 11/1998 |
| WO | 00/44151 | 7/2000 |
| WO | WO 00/62564 | 10/2000 |
| WO | 01/22748 | 3/2001 |
| WO | 01/31497 | 5/2001 |
| WO | 01/44977 | 6/2001 |
| WO | 01/57705 | 8/2001 |
| WO | 01/58178 | 8/2001 |
| WO | 01/63423 | 8/2001 |
| WO | 01/63897 | 8/2001 |
| WO | 01/65411 | 9/2001 |
| WO | 01/69406 | 9/2001 |
| WO | 01/71949 | 9/2001 |
| WO | 01/72063 | 9/2001 |
| WO | 01/77840 | 10/2001 |
| WO | 01/78425 | 10/2001 |
| WO | 01/91400 | 11/2001 |
| WO | 01/93551 | 12/2001 |
| WO | 01/97539 | 12/2001 |
| WO | WO 02/23423 | 3/2002 |
| WO | 02/31624 | 4/2002 |
| WO | 02/44834 | 6/2002 |
| WO | 02/44989 | 6/2002 |
| WO | 02/054803 | 7/2002 |
| WO | 02/059720 | 8/2002 |
| WO | 02/069585 | 9/2002 |
| WO | 02/075574 | 9/2002 |
| WO | 02/096056 | 9/2002 |
| WO | 02/080595 | 10/2002 |
| WO | 02/084895 | 10/2002 |
| WO | 03/015430 | 2/2003 |
| WO | 03/019845 | 3/2003 |
| WO | 03/024136 | 3/2003 |
| WO | 03/038638 | 5/2003 |
| WO | 03/088690 | 10/2003 |
| WO | 2004/034671 | 4/2004 |
| WO | 2004/054205 | 6/2004 |
| WO | 2004/084532 | 9/2004 |
| WO | 2004/086791 | 10/2004 |
| WO | 2004/100470 | 11/2004 |
| WO | 2004/100521 | 11/2004 |
| WO | 2004/107795 | 12/2004 |
| WO | 2004/114109 | 12/2004 |
| WO | 2005/015806 | 2/2005 |
| WO | 2005/029769 | 3/2005 |
| WO | 2005/062637 | 7/2005 |
| WO | 2005/073863 | 8/2005 |
| WO | 2005/076650 | 8/2005 |
| WO | WO2005/083980 | 9/2005 |
| WO | WO 2005/086927 | 9/2005 |
| WO | 2006/002869 | 1/2006 |
| WO | 2006/024003 | 3/2006 |
| WO | 2006/026505 | 3/2006 |
| WO | 2006/027407 | 3/2006 |
| WO | WO 2006/026505 | 3/2006 |
| WO | 2006/093284 | 9/2006 |
| WO | 2006/110446 | 10/2006 |
| WO | 2006/119481 | 11/2006 |
| WO | 2007/002025 | 1/2007 |
| WO | 2007/056698 | 5/2007 |
| WO | 2007/060451 | 5/2007 |
| WO | 2007/091089 | 8/2007 |
| WO | 2008/013437 | 1/2008 |
| WO | 2009/009507 | 1/2009 |
| WO | 2009/077888 | 1/2009 |
| WO | 2009/061914 | 5/2009 |
| WO | 2009/099876 | 8/2009 |
| WO | 2009/158097 | 12/2009 |

OTHER PUBLICATIONS

Communication Pursuant to Article 94(3) EPC, European Application No. 08 101 640.4, mailed Nov. 25, 2009.
European Patent Application No. EP08101640.4, European Search Report, completed Mar. 19, 2008.
European Application No. EP 08101331, European Search Report, completed Jun. 4, 2008.
PCT/EP2008/005084, International Preliminary Report on Patentability and Written Opinion, issued Nov. 17, 2009.
PCT/EP2008/057438, International Preliminary Report on Patentability, dated Dec. 17, 2009.

(56) References Cited

OTHER PUBLICATIONS

PCT/EP2008/058117, International Search Report and Written Opinion, mailed Feb. 13, 2009.
Office Action, related U.S. Appl. No. 12/221,028, mailed Feb. 19, 2009.
U.K. Search Report under Section 17, U.K. Application No. GB0803468.8, dated Jun. 4, 2008.
U.K. Search Report under Section 17, U.K. Patent App. No. GB0809536.6, dated Jun. 9, 2008.
U.K. Search Report Under Section 17, U.K Application No. GB 0712291.4.
UK Search Report under Section 17, Application No. GB0709426.1, dated Sep. 10, 2007.
PCT/EP2008/057438, International Search Report and Written Opinion of the International Searching Authority, mailed Jan. 22, 2009.
Hillard, Dustin et al., "Improving Ad Relevance in Sponsored Search", Proceedings of the third ACM international conference on Web search and data mining, WSDM'10, Feb. 4-6, 2010, Session: Ads, pp. 361-369, ACM, New York, New York, USA, 2010., Feb. 4, 2010, 361-369.
Internet Reference, "Specific Media Behavioral Targeting Index", Specific Media, Inc., Irvine, CA, 2010, Available online at http://www.specificmedia.com/behavioral-targeting.php.
Langheinrich, Marc et al., "Unintrusive Customization Techniques for Web Advertising", Computer Networks: The International Journal of Computer and Telecommunications Networking, vol. 31, No. 11, May 1999, pp. 1259-1272, Elsevier North-Holland, Inc., New York, NY, 1999., May 11, 1999, 1259-1272.
Regelson, Moira et al., "Predicting Click-Through Rate Using Keyword Clusters", Proceedings of the Second Workshop on Sponsored Search Auctions, EC'06, SSA2, Jun. 11, 2006, ACM, 2006., Jun. 11, 2006.
Richardson, Matthew et al., "Predicting Clicks: Estimating the Click-Through Rate for New Ads", Proceedings of the 16th international conference on World Wide Web, Banff, Alberta, Canada, May 8-12, 2007, Session: Advertisements & click estimates, pp. 521-529, ACM, 2007., May, 8, 2007, 521-529.
Shaikh, Baber M. et al., "Customized User Segments for Ad Targeting", IP.com Prior Art Database Disclosure, Pub No. IPCOM000185640D, dated Jul. 29, 2009 UTC, IP.com, Amherst, NY (Available online at http://priorartdatabase.com/IPCOM/000185640, last visited Aug. 30, 2010)., Jul. 29, 2009.
United Kingdom Search Report dated Apr. 13, 2007 for UK Application No. GB0700340.3.
European Search Report dated Jun. 26, 2008 for European Patent Application No. 08155590.6.
International Search Report dated May 6, 2008 for International Application No. PCT/EP2008/050208.
Written Opinion of the International Search Authority dated May 6, 2008 for International Application No. PCT/EP2008/050208.
"AdWords Reference Guide", Google, 2004.
Ghose, Anindya et al., "An Empirical Analysis of Search Engine Advertising: Sponsored Search in Electronic Markets", Management Science, Informs, 2009.
Karuga, Gilber G. et al., "AdPalette: An Algorithm for Customizing Online Advertisements on the Fly", Decision Support Systems, vol. 32, 2001.
Science Dictionary, Definition of "dynamic", 2002.
World English Dictionary, Definition of "relevant", 1998.

* cited by examiner

ADVERTISEMENT SCHEDULING

CROSS-REFERENCE TO RELATED APPLICATIONS

This application is a continuation of U.S. patent application Ser. No. 11/996,870, filed Jan. 9, 2008, now U.S. Pat. No. 8,417,226, which is the National Stage of International Application No. PCT/EP2008/050208, filed Jan. 9, 2008, which claims the benefit of GB0700340.3 filed Jan. 9, 2007, and GB0716001.3 filed Aug. 16, 2007; all of which are incorporated by reference in their entireties, for all purposes, herein.

FIELD OF THE INVENTION

The present invention relates to scheduling the transmission of messages to a subscriber in a communications network, and is particularly, but not exclusively, suited to the transmission of unsolicited messages in a mobile network.

BACKGROUND OF THE INVENTION

The transmission of messages to mobile devices is a widely used and popular service, and the major messaging types in the GSM network (Global System for Mobile Communications) are the Short Message Service (SMS) and the Multimedia Message Service (MMS). The messages are typically sent from and received by a user terminal such as mobile phone or Personal Digital Assistant (PDA). Mobile communication networks can also be used to send and receive other type of messages including electronic mail messages, voice messages, video messages, and picture messages.

Mobile marketing is widely considered by advertisers to be a significant channel for providing access to a consumer due to the fact that a mobile terminal is personal, it is "always on", and, by virtue of collaborative communications, is implicitly a member of one or more groups. These characteristics, when combined with the social networks-based marketing approach of the Internet, are seen as having the potential to form a very powerful marketing base.

Today's mobile marketing is largely based on push campaigns that are designed to opt-in a consumer, or pull campaigns that acquire mobile phone numbers from consumers. The most typical example of the pull campaign is the "text-to-win" campaign, where e.g., a soft drink bottle contains a short code and a number, and the mobile user sends the code via a text message to the number. In return, the consumer receives a notification if they have won; irrespective of the winning status, the consumer also receives selected marketing messages or a series of messages that are broadcast to the mobile terminal. Another popular method is direct advertisement, which is typically performed using text and picture messaging.

A problem with these approaches is that they do not take account of the user's activities at the time of sending the promotional message. As a result a message can be sent at a time that is inconvenient for the user, causing the recipient to ignore and delete this and any subsequently received such messages; as a result the marketing efforts are completely wasted. U.S. Pat. No. 6,889,054 describes providing a user with the means for explicitly specifying times at which they are willing to receive promotional messages, this then being used to compile an advertisement schedule for pushing advertisements to the user. However, a problem with this approach is that it is relatively burdensome on the user, since, if the schedule is to capture appropriate times to send messages based on the user's activities, the schedule requires detailed input from the user.

SUMMARY OF THE INVENTION

In accordance with one aspect of the present invention, there is provided a method of, and system for, scheduling transmission of messages to a subscriber in a communications network according to the appended claims.

In one arrangement of an embodiment of the invention the method comprises:

monitoring communications events associated with a subscriber so as to identify a communications event as one of a plurality of predetermined types of communications events; and responsive to the identified communications event, triggering a scheduling process for scheduling transmission of a message to the subscriber, in which the scheduling process is dependent on the type of communications event.

Thus in embodiments of the invention, the transmission of messages is determined on the basis of communications events associated with the subscriber; typical communications events include making calls, sending messages, switching off, switching on, roaming, cell to cell handover, answering calls, and trends relating thereto. The method can include reviewing the communications events no as to identify likely actions and availability of the subscriber, and using this information to ensure that messages are received by a subscriber at a time that is convenient to their actions and availability.

In at least some arrangements the transmission of messages is determined on the basis of completed communications events, as can be established from sources such as a Home Location Register (to access network registration information), and/or a billing system (to access Call Detail Records), and/or a database storing data indicating usage of unlicensed network resources, and/or request messages sent directly from the subscriber.

The method can include selecting one or more scheduling rules on the basis of the identified communications event(s) and processing the or each selected rule on the basis thereof so as to create a schedule for use in message transmission. The scheduling rules can be dependent on any one or some of: the time of the monitored communications event; previously observed actions taken by the subscriber in response to previously transmitted messages; subscriber-specified data comprising time slots for message transmission; actions taken by elected subscribers different to the subscriber; and/or availability of network resources.

The format for the message can be selected on the basis of subscriber preferences and/or previously observed actions taken by the subscriber in response to previously transmitted messages. This aspect of the invention could be useful when the messages are promotional messages, since the objective is to maximise the probability of the subscriber paying attention, and responding to, the message.

Most conveniently the content of the message can be selected from a content storage system arranged to hold content data items and data identifying characteristics thereof. The selection process can involve correlating preferences indicated by the subscriber in relation to subject matter of interest with the characteristics of said stored content data items.

Further features and advantages of the invention will become apparent from the following description of preferred embodiments of the invention, given by way of example only, which is made with reference to the accompanying drawings.

DETAILED DESCRIPTION OF THE INVENTION

Embodiments of the invention are concerned with monitoring communication sessions and using temporal information relating thereto in order to schedule transmission of messages. The nature of the scheduling and the criteria relating thereto is described in detail later, but first a description of the infrastructure needed to support embodiments of the invention will be presented.

Figure 1:
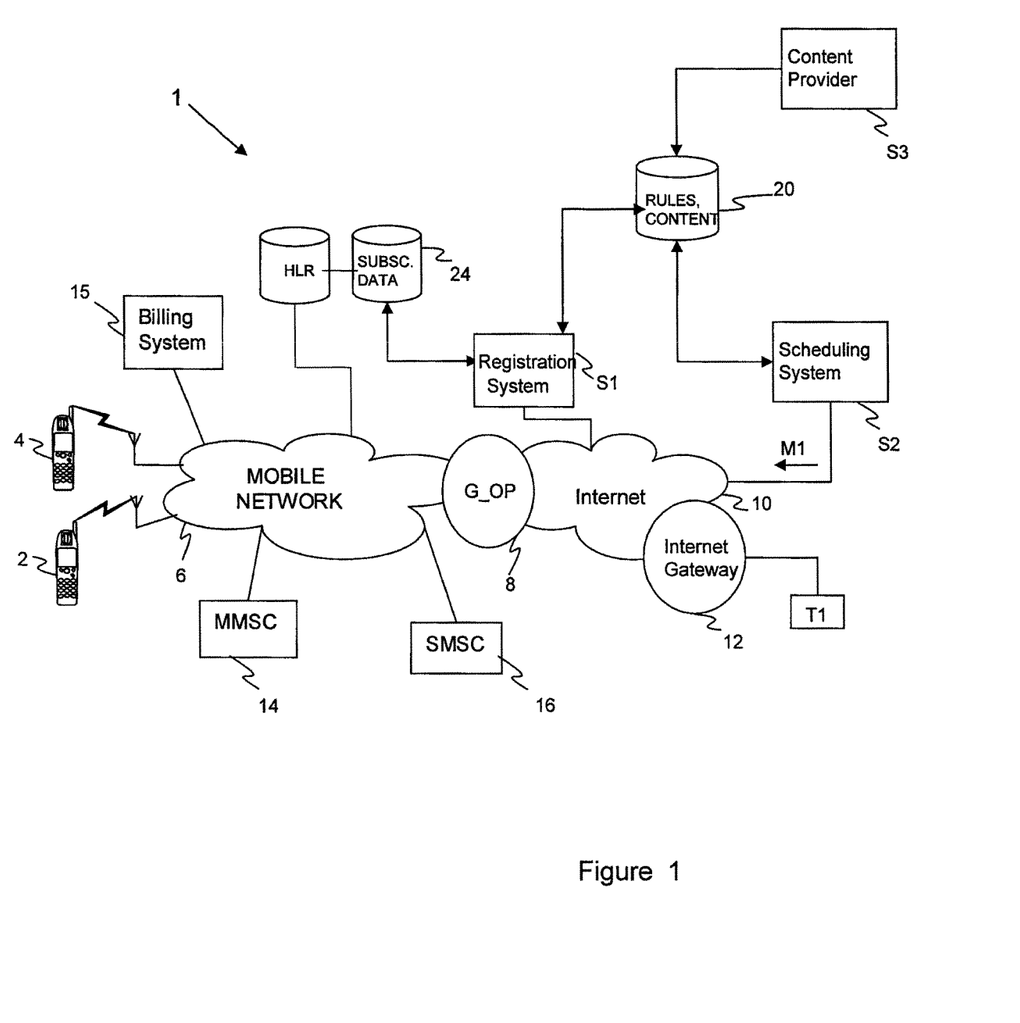
FIG. 1 is a schematic block diagram showing a data messaging system arranged to support embodiments of the invention.

FIG. 1 shows an example of a data messaging system 1 within which embodiments of the invention operate for the example of the scheduling of short message service messages (SMS); it will be appreciated that other message types, such as multimedia message service (MMS), email messages, bespoke messages in the form of GPRS data and/or streamed data and voice messages and/or streamed or downloaded video and voice messages, can alternatively be scheduled according to embodiments of the invention, and that the specific arrangement of the data messaging system 1 is dependent on the type of message being transmitted.

In the arrangement shown in FIG. 1, a terminal 2 communicates with various network devices within the data messaging system 1 via the mobile network 6, which comprises: a conventional radio and switching network comprising base stations; switches (not shown) arranged in a conventional manner; and a home location register (HLR) for maintaining data relating to subscribers of the network. The mobile network 6 also comprises a billing system 15 for holding Call Detail Records (CDRs) relating to network services used by subscribers of the network 6 and store-and-forward message servers MMSC, SMSC 14, 16 configured to store and forward messages in accordance with conventional methods. The terminal 2 may be a wireless terminal such as a mobile phone or a PDA. The data messaging system 1 also comprises a WAP gateway 8, which is typically a network operator's WAP gateway, and a registration services server S1, with which a terminal T1, typically connected to the Internet 10, communicates via internet gateway 12. The terminal T1 can be e.g. a laptop computer or a personal computer fixedly attached to a network, and the registration service server S1 can be accessed by actuating a URL corresponding to the server S1. In addition the data messaging system 1 comprises content database 20, which is populated with content data from content providers such as information sources and/or advertisers and the like.

In embodiments of the invention it is assumed that the user of the terminal 2 is a subscriber of the network, and that subscribers have entered data indicative of their demographic data, preferences and interests, these data being received and stored by the registration server S1 in the subscriber database 24. As described above, the subscriber database 24 can be associated with a HLR for the mobile network 6: in a preferred arrangement, the preference data can be stored in a logically distinct storage area to that in which the network services and subscription data are stored, thereby decoupling the storage of preference data from the storage of network services data.

Broadly speaking, embodiments of the invention comprise two related processes, each of which is performed by the scheduling server S2 in respect of individual subscribers. The first process is a monitoring process, which operates so as to identify communication events such as registration and deregistration with the mobile network 6, making calls, sending messages, switching off, switching on, roaming, cell to cell handover, answering calls, and trends relating thereto; the first process can also include analysing these events in order to derive a set of message transmission rules. In one arrangement the source of data for the monitoring process is call detail records (CDRs) maintained by the billing system 15. These CDRs typically include parameters detailing the type of network usage (voice/data) used by the subscriber, together with temporal data relating thereto (time of usage, duration of usage); these parameters are subsequently analysed as described in detail below to populate message transmission rules.

The second process is a message selection and scheduling process, in which the transmission time for messages is selected on the basis of the message transmission rules. The messages that are selected for transmission are preferably selected from the content database 20, and in one arrangement are promotional messages. The transmission time can additionally be selected on the basis of temporal preference data specified by subscribers (such as "No messages between 01:00-07:00") and/or preference data specified by the content providers, while the content of the promotional message is selected by matching preferred subject matter specified by subscribers with the subject matter of the promotional messages.

Figure 2:
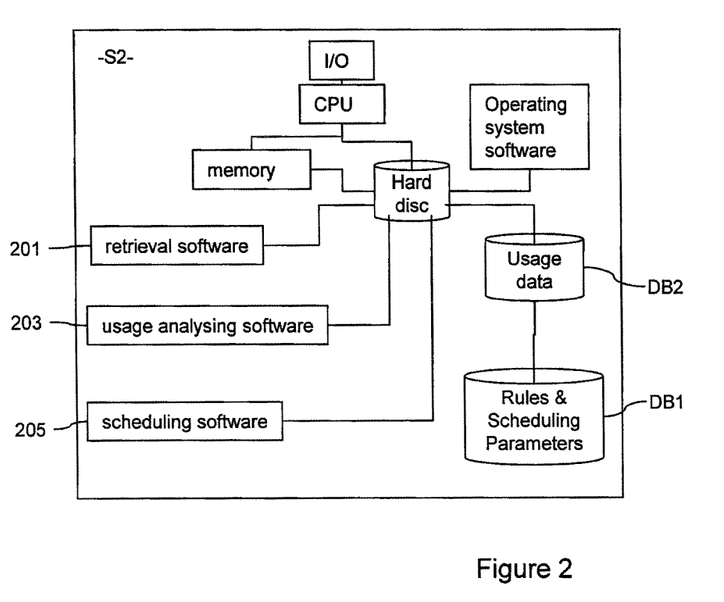
FIG. 2 is a schematic block diagram showing components of a scheduling system shown in FIG. 1.
Figure 3:
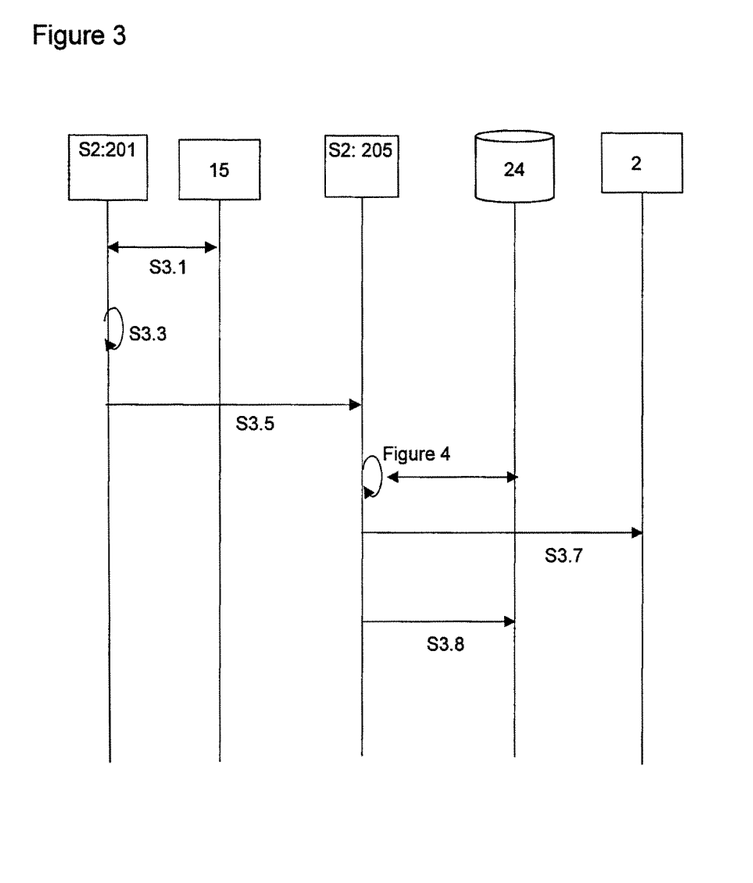
FIG. 3 is a timing diagram showing interactions between components of the data messaging system shown in FIG. 1.

Turning now to FIGS. 2 and 3, the functionality of the scheduling server S2 will be described in more detail: in addition to standard CPU, memory, data bus, Input/Output ports, data storage, and operating system programs, the server S2 comprises various bespoke software components 201, 203, 205, some or all of which cooperate so as to determine a schedule for message transmission. In one arrangement messages are scheduled for transmission on the basis of historical data, while in another arrangement the scheduling server S2 operates on real-time data—in other words the server S2 queries the CDR records stored in the billing system 15 and/or subscriber records stored in the HLR in real time in order to schedule the transmission of messages.

Considering first the arrangement in which transmission is based on historical data retrieved from the billing system 15, the server S2 comprises retrieval software 201, which periodically queries the billing system 15 for CDRs, either in respect of specific subscribers or in respect of all subscribers. The retrieval software 201 processes the CDRs in order to identify time and duration of network usage, and stores the identified temporal data corresponding to each usage event in local storage DB2. Usage data corresponding to a specified period are then analysed by a usage analysing software component 203, in order to populate values of the following scheduling parameters for each subscriber:

1. Night. The definition of the "night" varies from subscriber to subscriber and from day to day: for example during the weekends one subscriber might go out to disco, party etc., which means that they will be engaging in communications until later than they do during the week, while another subscriber might work night-shifts for certain periods during a month. The value of the "night" parameter is populated as a function of day of the week, on the basis of observed communications events stored in the usage storage DB2.

2. Morning. As for "night", the value of the "morning" parameter is populated as a function of day of the week, on the basis of observed communications events stored in the usage storage DB2.

3. Busy. During certain periods of the day, the subscriber is involved in work-related communications events, which should continue uninterrupted by unsolicited messages. The value of the "busy" parameter is populated as a function of day of the week, on the basis of observed communications events stored in the usage storage DB2. It is to be noted that there might be several "busy" periods during a given day.

The values of these parameters are subsequently stored in local storage DB2 for use by the scheduling software component 205 at one or more specified scheduling times. The scheduling software component 205 can operate once or several times daily: message delivery rules R1 . . . R3 described below can be processed in conjunction with temporal preference parameters, so as to draw up a schedule for message delivery for part or all of a day; for each subscriber, the schedule can subsequently be stored in the local storage areas DB1, DB2.

Considering now the second arrangement, in which transmission is based on real-time data, the retrieval software 201 periodically queries the billing system 15 for CDRs, either in respect of specific subscribers or in respect of all subscribers. However, in this arrangement, in the event that there are no on-going or completed communications events, no action is taken; in the event that communications events are on-going or have just completed, the retrieval software component 201 triggers the scheduling software component 205 to process delivery rules R1 . . . R3 stored in local storage DB1.

The message delivery rules thus include a first set of rules for real-time querying of CDRs and a second set of rules for querying historical data (i.e. the usage data storage DB2). Examples of the rules are as follows:

|  | Real Time | Historical |
|---|---|---|
| R1: Night Rule | IF night time activity observed THEN wait at least a period of X1 before sending any messages | WAIT at least ["Night" + X1] before sending any messages |
| R2: Morning Rule | IF no activity yet during the day then wait at least a period of X2 + activity observed before sending any messages | WAIT at least ["Morning" + X2] before sending any messages |
| R3: Busy Rule | IF communication session ongoing do not send advertisement; Wait X3 minutes before sending message after communication session is over | WAIT at least ["Busy" + X3] before sending any messages |

The values of X1, X2 and X3 are configurable and are stored in the usage database DB2; the value can be modified based on preference data specified by, and subsequently updated by feedback received from, the subscriber. It will be appreciated that rules R1 . . . R3 are an illustrative and non-exhaustive set of rules for use in scheduling message transmission.

These rules are processed by the scheduling software component 205, which additionally checks the output of rules R1 . . . R3 against temporal preference data specified by the subscriber. These temporal preference data can be embodied as parameters (PP), and can include some, or all, of the following:

| | |
|---|---|
| PP 1 | Time of the day acceptable for receiving unsolicited messages |
| PP 2 | Day of the week acceptable for receiving unsolicited messages |
| PP 3 | Week of the month acceptable for receiving unsolicited messages |
| PP 4 | Month of the year acceptable for receiving unsolicited messages |
| PP 5 | Time delay after previous communication event before unsolicited messages can be sent (per type of event) |
| PP 6 | Indication that unsolicited messages should be sent only on a request basis (flag) |
| PP 7 | Type of communication which can include unsolicited messages |
| PP 8 | Communication patterns which can include unsolicited messages |
| PP 9 | Period of no unsolicited messages |
| PP 10 | Time delay between successively transmitted unsolicited messages |

In the absence of input from the subscriber in respect of one or more of these temporal preference parameters, the or each parameter can be populated with a set of default values or ones used mostly by the peer group/community in which the subscriber belongs, as indicated in the subscriber's records stored in database 24.

The scheduling software component 205 also selects content for a message to be sent on the basis of a match between the content available in content database 20 and the preference data specified in subscriber database 24. The schedule can comprise a plurality of message transmission events, each corresponding to transmission of a given message and having a link to content selected from the content database 20 for the given message; when a message is due for transmission, a message M1 is created on the basis of the selected content and is transmitted to the subscriber.

In the event that messages are scheduled for delivery in real time, a plurality of schedules are generated during a day—each for immediate, or near, execution, and thus are typically held in memory until a timer equal to delay X1, X2 or X3 (as appropriate) has expired.

In addition to the temporal rules described above, the scheduling system server S2 has access to data indicative of actions taken by the terminal 2 in response to receipt of the message M1, and can use these data to determine feedback in respect of the unsolicited messages M1. The feedback can be captured via a further monitoring system (not shown), which monitors subscriber activity and correlates same with the content of the message M1. The output of the further monitoring system is then made available to the scheduling software component 205 in the form of further rules stored in the usage local data storage DB2; these include the following:

FR1. If a response is more likely immediately after SMS/MMS sending and receiving session then send message M1 as SMS/MMS;

FR2. If a response to an unsolicited message is more likely after or during certain communication event(s), then send message M1 after/during that/those event(s);

FR3. If more feedback is received in relation to message M1 during or after communication between certain parties (2 and 4), then send advertisements during/after those sessions;

FR4. Send message M1 just before actual communication message between 2 and 4 (this can be achieved by interrupting transmission of a message from 2 to 4, sending message M1, and then sending the message on to terminal 4);

FR5. Send the same or a similar message to M1 to both or all parties to a communications session after/during the communications session.

It will be appreciated that FR2-FR5 are real-time rules, so would be actioned at the same time as processing rules R1 ... R3. Moreover, FR4 applies exclusively to ongoing communications sessions, while FR5 can be applied to messages sent between a group of subscribers.

Figure 4:
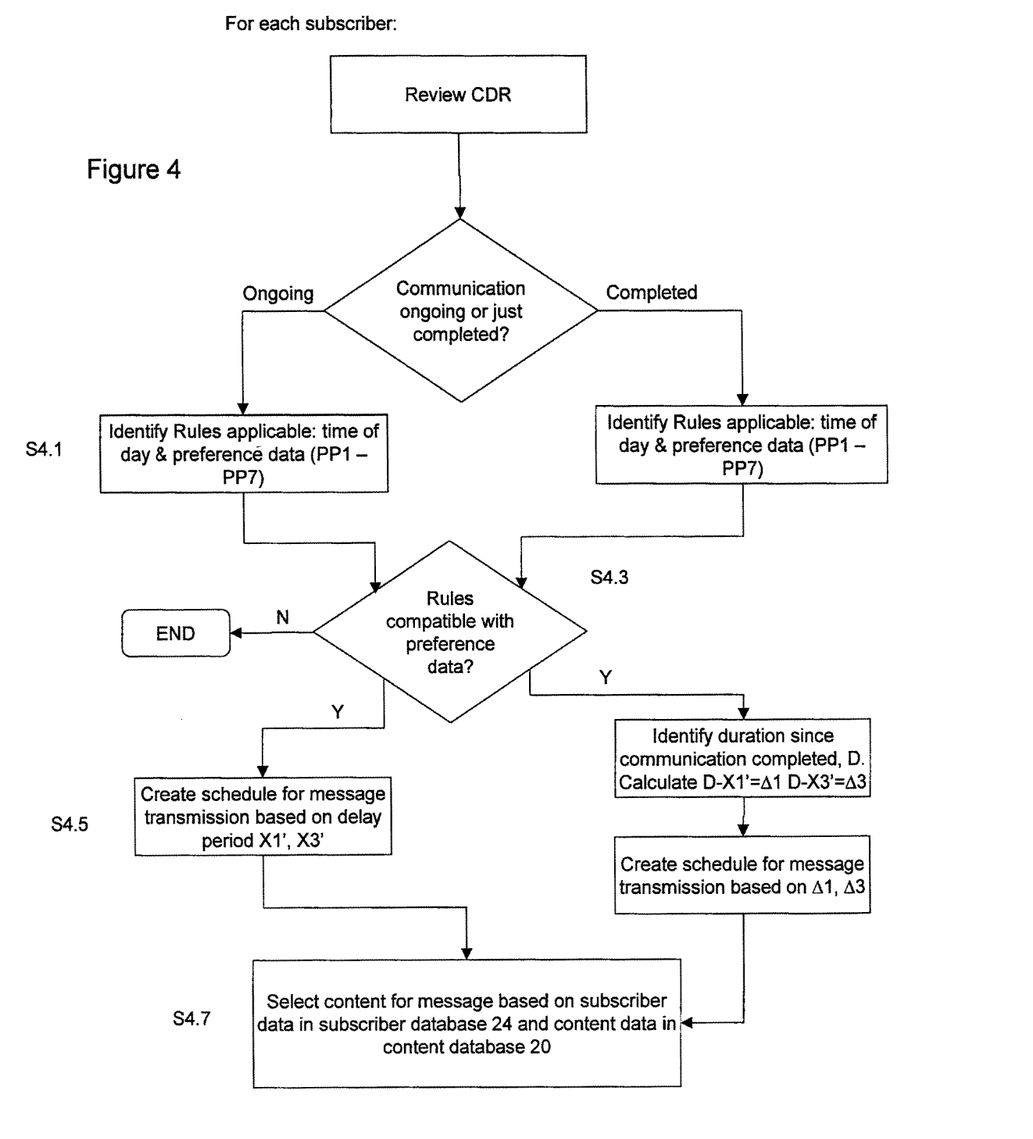
FIG. 4 is a schematic flow diagram showing steps performed by certain components of the scheduling system shown in FIG. 2.

Turning to FIG. 3, an example of the steps associated with the scheduling of unsolicited messages in real time and at night will now be described, in relation to rules R1, R2, R3 and preference parameters PP1 ... PP10. At step S3.1, the retrieval software component 201 queries the billing system in respect of subscribers that are currently engaged in, or who have just completed communications sessions; accordingly the retrieval software component 201 receives a plurality of CDRs, and processes the same in order to extract a) subscriber and b) current communications session or c) just-completed communications session (step S3.3). For those subscribers determined to be category (b) or (c), the retrieval software component 201 triggers operation of the scheduling software component 205 (step S3.5), which responds by splitting the received data into two groups: (b) and (c). Turning to FIG. 4, for the case of a subscriber determined to be in group (b), the scheduling software component 205 identifies which of rules R1-R3 might apply (step 4.1) and checks that the applicable rules are compatible with the preference parameters PP1 ... PP10 (step 4.3); since the process is being run at night, rule R2 is eliminated; assuming the conditions specified in preference parameters PP1, PP5, PP9 & PP10 to be satisfied, the scheduling software component 205 can then schedule transmission of a message when periods X1 and X3 have expired. If, however, one or more of the preference parameters are not satisfied, the scheduling process either ends or the scheduled time of message transmission is modified in accordance with the temporal constraints associated with a given preference parameter (e.g. in accordance with modified delay periods X1', X3': step 4.5).

Assuming message transmission to have been successfully scheduled, the scheduling software component 205 selects content for, and type of, message M1 (step 4.7) from the content database 20 on the basis of the interests and preference data stored in storage 24. In relation to format for the message M1, the scheduling software could process further rule FR1 in conjunction with message sending preference data specified by the subscriber.

Turning back to FIG. 3, at the scheduled delivery time, a message M1, of the selected format and comprising the content selected at step S4.7, is transmitted to the subscriber, and the subscriber database 24 is updated to indicate the time, content and type of message transmission. This information is subsequently used in relation to preference parameters PP5 and PP10 and by the feedback system.

In relation to a subscriber for which the CDR retrieved at step S3.1 indicates completion of a communications session, the scheduling software component 205 progresses as described above, but performs the additional step of adjusting the scheduled time of message delivery to account for the amount of time that has expired since the end of the communications session.

In relation to the further rules FR1 ... FR5, the real-time embodiment implicitly satisfies the "after" versions of rules FR2, FR3 and FR5; since the "during" versions of rules FR2, FR3 and FR5 conflict with the conditions of rules R1-R3, the further rules are preferably only applied at times of the day in which rules R1 and R2 do not apply (e.g. during the day). In relation to "Busy" rule R3, this conflicts with the "during" versions of FR2, FR3 and FR5, and the scheduling software component 205 consequently makes recourse to preference parameter PP8 so as to identify which of rules R3, or FR2/FR3 should be applied.

Additional Details And Alternatives

The above embodiments are to be understood as illustrative examples of the invention and further arrangements are envisaged. For example in addition, or as an alternative, to scheduling the transmission of messages on the basis of communications activities, the schedule can be drawn up on the basis of subscriber-selectable settings such as "send all promotional messages at time T1"; and/or schedules can be drawn up for groups of subscribers; and/or a subscriber can elect a subscriber and specify that the schedule mirrors that of the elected subscriber; and/or a subscriber can request that all promotional messages are transmitted with a selected application or message to a messages delivery system.

In addition, whilst the above embodiments describe accessing the billing system 15 and retrieving CDRs relating to ongoing or completed communications events, the retrieval software 201 could alternatively access the HLR to determine registration status of the subscriber. In these alternative embodiments, the communications event is registration with the network, and this event can trigger generation of a schedule according to the method described above (the time of registration determining which of rules R1 and R2 might apply). In a yet further arrangement, such as one in which the user is connected to a Wireless Local Area Network (WLAN), the source of data for the monitoring process could be WLAN access login information.

The mobile network 6 can comprise any cellular network technologies which include, but are not limited to, GSM, $3^{rd}$ generation networks, WCDMA, CDMA and GPRS. In addition to traditional cellular networks, unlicensed networks such as Wireless Local area networks (WLAN), Bluetooth™ (BT) and other technologies such as WiMax, Broadcasting over DVB-H, ISDB-T and DMB can be used to deliver the scheduled messages. The terminal 2 can use the same network or another network for delivery of the messages: i.e. a hybrid network for delivery of messages and voice communications is possible.

Said scheduled messages can be delivered in efficient way using the broadcast networks to many subscribers at the same time.

The terminal 2 can be equipped with a bespoke application arranged to receive messages from a specified system according to a first schedule, and to display the message to the subscriber according to a second schedule. The second schedule can be stored locally on the terminal, or stored remotely in conjunction with the subscriber's record in database 24 and downloaded to the terminal 2. This enables message M1 to be sent in accordance with the first schedule, which is drawn up in dependence on e.g. the availability of network resources (capacity/hotspots/broadcast networks etc.), but viewed in accordance with the second schedule, which can be determined from the subscriber's preferences and availability, as described above.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

We claim:

1. A method comprising:
populating, by a processor, at least one scheduling parameter value based on an analysis of identified communication events associated with a user, wherein the at least one scheduling parameter value indicates a time when the user performs a recurring activity and is populated as a function of time on the basis of the identified communication events; and
deriving, by the processor, a set of message transmission rules associated with the user based on the at least one populated scheduling parameter, wherein the set of message transmission rules dictate when messages are to be transmitted to the user in relation to the at least one populated scheduling parameter.

2. The method of claim 1, further comprising:
monitoring a communications network to identify communication events associated with the user, wherein the monitoring includes querying Call Detail Records to identify communication sessions associated with the user.

3. The method of claim 1, further comprising:
scheduling transmission of a message to the user based on the message transmission rules.

4. The method of claim 1, wherein deriving a set of message transmission rules comprises deriving a first set of message transmission rules for real-time communication events and a second set of message transmission rules for historical communication events.

5. The method of claim 1, wherein deriving a set of message transmission rules is further based on temporal preference data specified by the user.

6. The method of claim 2, further comprising:
receiving response data indicative of actions taken by the user in response to receipt of the message, wherein deriving a set of message transmission rules is further based on the received response data.

7. The method of claim 1, wherein deriving set of message transmission rules comprises setting values for parameters defining the availability of the user.

8. A system comprising:
a processor; and
a memory containing instructions that, when executed, cause the processor to:
populate at least one scheduling parameter value based on an analysis of identified communication events associated with a user, wherein the at least one scheduling parameter value indicates a time when the user performs a recurring activity and is populated as a function of time on the basis of the identified communication events; and
derive a set of message transmission rules associated with the user based on the at least one populated scheduling parameter, wherein the set of message transmission rules dictate when messages are to be transmitted to the user in relation to the at least one populated scheduling parameter.

9. The system of claim 8, wherein the instructions further cause the processor to:
monitor a communications network to identify communication events associated with the user, wherein the monitoring includes querying Call Detail Records to identify communication sessions associated with the user.

10. The system of claim 8, wherein the instructions further cause the processor to:
schedule transmission of a message to the user based on the message transmission rules.

11. The system of claim 8, wherein deriving a set of message transmission rules comprises deriving a first set of message transmission rules for real-time communication events and a second set of message transmission rules for historical communication events.

12. The system of claim 8, wherein deriving a set of message transmission rules is further based on temporal preference data specified by the user.

13. The system of claim 10, wherein the instructions further cause the processor to:
receive response data indicative of actions taken by the user in response to receipt of the message, wherein deriving a set of message transmission rules is further based on the received response data.

14. The system of claim 8, wherein deriving set of message transmission rules comprises setting values for parameters defining the availability of the user.

15. A non-transitory computer-readable medium containing instructions that, when executed by a computing device, cause the computing device to:
populate at least one scheduling parameter value based on an analysis of identified communication events associated with a user, wherein the at least one scheduling parameter value indicates a time when the user performs a recurring activity and is populated as a function of time on the basis of the identified communication events; and
derive a set of message transmission rules associated with the user based on the at least one populated scheduling parameter, wherein the set of message transmission rules dictate when messages are to be transmitted to the user in relation to the at least one populated scheduling parameter.

16. The non-transitory computer-readable medium of claim 15, wherein the instructions further cause the processor to:
monitor a communications network to identify communication events associated with the user, wherein the monitoring includes querying Call Detail Records to identify communication sessions associated with the user.

17. The non-transitory computer-readable medium of claim 15, wherein the instructions further cause the processor to:
schedule transmission of a message to the user based on the message transmission rules.

18. The non-transitory computer-readable medium of claim 15, wherein deriving a set of message transmission rules comprises deriving a first set of message transmission rules for real-time communication events and a second set of message transmission rules for historical communication events.

19. The non-transitory computer-readable medium of claim 15, wherein deriving a set of message transmission rules is further based on temporal preference data specified by the user.

20. The non-transitory computer-readable medium of claim 17, wherein the instructions further cause the processor to:
receive response data indicative of actions taken by the user in response to receipt of the message, wherein deriving a set of message transmission rules is further based on the received response data.

21. The non-transitory computer-readable medium of claim 15, wherein deriving set of message transmission rules comprises setting values for parameters defining the availability of the user.

* * * * *